(12) United States Patent
Nilsson et al.

(10) Patent No.: US 12,164,502 B2
(45) Date of Patent: *Dec. 10, 2024

(54) DIGITAL CONTENT INTEGRITY VERIFICATION SYSTEMS AND METHODS

(71) Applicant: Intertrust Technologies Corporation, Berkeley, CA (US)

(72) Inventors: Jarl A. Nilsson, Mountain View, CA (US); Gadi Ittah, Cupertino, CA (US); Yutaka Nagao, San Jose, CA (US)

(73) Assignee: Intertrust Technologies Corporation, Berkeley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/381,993

(22) Filed: Oct. 19, 2023

(65) Prior Publication Data

US 2024/0045856 A1    Feb. 8, 2024

Related U.S. Application Data

(63) Continuation of application No. 18/123,129, filed on Mar. 17, 2023, now Pat. No. 11,899,653, which is a continuation of application No. 16/420,119, filed on May 22, 2019, now Pat. No. 11,615,070.

(60) Provisional application No. 62/676,365, filed on May 25, 2018.

(51) Int. Cl.
*G06F 16/22*     (2019.01)
*G06F 16/23*     (2019.01)
*H04L 9/00*     (2022.01)
*H04L 9/06*     (2006.01)

(52) U.S. Cl.
CPC ...... *G06F 16/2365* (2019.01); *G06F 16/2255* (2019.01); *G06F 16/2379* (2019.01); *H04L 9/0637* (2013.01); *H04L 9/50* (2022.05)

(58) Field of Classification Search
None
See application file for complete search history.

(56) References Cited

U.S. PATENT DOCUMENTS

| 2018/0068091 | A1* | 3/2018 | Gaidar | G06F 21/16 |
| 2018/0374173 | A1* | 12/2018 | Chen | G06Q 50/184 |
| 2019/0190719 | A1* | 6/2019 | van de Ruit | H04L 9/3239 |
| 2019/0228133 | A1* | 7/2019 | Ansari | H04L 9/0643 |

* cited by examiner

*Primary Examiner* — Eddy Cheung
(74) *Attorney, Agent, or Firm* — John P. Davis; Thayne and Davis LLC

(57) ABSTRACT

The disclosure relates to, among other things, systems and methods for facilitating the verification of the integrity of digital content. Embodiments of the disclosed systems and methods may provide mechanisms for generating a secure and unambiguous record of the creation and/or modification of digital content and/or other media associated with events. Further embodiments may provide for a ledger configured to capture a record of creation and/or modification actions performed in connection with digital content.

22 Claims, 8 Drawing Sheets

DIGITAL CONTENT INTEGRITY VERIFICATION SYSTEMS AND METHODS

RELATED APPLICATION

This application is a continuation of U.S. application Ser. No. 18/123,129, filed Mar. 17, 2023, and entitled "DIGITAL CONTENT INTEGRITY VERIFICATION SYSTEMS AND METHODS," which is a continuation of U.S. application Ser. No. 16/420,119, filed May 22, 2019, and entitled "DIGITAL CONTENT INTEGRITY VERIFICATION SYSTEMS AND METHODS," which claims the benefit of priority under 35 U.S.C. § 119(e) to U.S. Provisional Patent Application No. 62/676,365, filed May 25, 2018, and entitled "SYSTEMS AND METHODS FOR VERIFYING THE INTEGRITY OF DIGITAL CONTENT," the contents of which are hereby incorporated by reference in their entireties.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for verifying the integrity and/or provenance of digital content and/or media. More specifically, the present disclosure relates to systems and methods for verifying the integrity and/or provenance of digital content and/or media using distributed ledgers and/or databases.

Digital content and/or media is increasingly becoming a primary source of information for many consumers. For example, many consumers now receive news information in digital formats. Traditionally, news was curated and delivered by established news and media organizations that relied on the public's trust in the authenticity of the information they provided. Widely adopted journalistic standards operated to ensure the integrity and authenticity of published information (e.g., source verification, reporting with attribution, independent fact checking, publication of corrections when discovered, and/or the like).

Digital media may deliver news and/or records of events to users at and/or shortly after the occurrence of an event. With the proliferation of various Internet connected mobile devices with recording capabilities, anyone can in effect become a news reporter and/or publisher of digital media. The volume and speed associated with modern digital media creation and distribution provides less time for curation and analysis. Emerging technologies that can fabricate entire fake audio and video events and/or events where the record has been distorted also introduce new concerns relating to the integrity and/or provenance of digital media and/or associated content.

Embodiments of the systems and methods disclosed herein may provide a mechanism for generating a secure and unambiguous record of the creation and/or modification of digital content and/or other media associated with events (e.g., news events). Further embodiments may provide for a ledger configured to capture a record of creation and/or modification actions performed in connection with digital content. In certain embodiments, the disclosed systems and methods may allow for the entry of records anonymously to protect sources from retribution and/or retaliation while also allowing a source to claim ownership and/or attribution at a later date.

Various embodiments provide for systems and methods where events recorded by devices may be publicly verified as to who created and/or recorded associated digital content, what created and/or recorded the digital content, where the digital content was created and/or recorded, when the digital content was created and/or recorded, when the digital content was modified and/or otherwise edited or changed and/or by what, and/or the like. Further embodiments may provide for systems and methods for generating a pedigree of data with information about the chain of handling of digital content. In connection with a whistle-blower situation, the disclosed embodiments may allow the originator of digital content associated with an event to provide an anonymous proof of ownership. Additionally, various embodiments allow for a consumer of digital media to easily verify the pedigree and/or prominence of the media.

Consistent with various embodiments disclosed herein, trusted databases, ledgers, and/or the like, may be used to record and/or otherwise manage various assertions associated with actions performed in connection with digital content, including assertions relating to content attribution, ownership, creation, modification, processing, and/or the like. Trusted databases and/or ledgers consistent with certain embodiments disclosed herein may, among other things, facilitate one or more of:

Creating a digital record and/or proof of origin of digital media (e.g., a digital stream).

Providing an anonymous proof of attribution, ownership, and/or original creation for digital media.

Providing a traceable chain of handling and/or indication of provenance for digital media.

Providing consumers with a trusted way to audit and/or otherwise verify a digital claim associated with digital media.

In some embodiments, such databases and/or ledgers may be distributed, and may be referred to herein as trusted immutable distributed assertion ledgers ("TIDALs"), and/or variations of the same. Databases and/or ledgers may, in various embodiments, be public, private, and/or a combination thereof. In certain embodiments, a TIDAL may comprise a public indelible distributed database ("PIDD"). TIDALs consistent with various aspects of the disclosed embodiments may be associated with a variety of properties including, for example, ledger processes that may be resistant to byzantine failures, entries that may be immutable and/or relatively immutable, entries that may be time-synced (at least in part), entries that may be scalable, and/or entries that may be available for relatively fast lookup.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
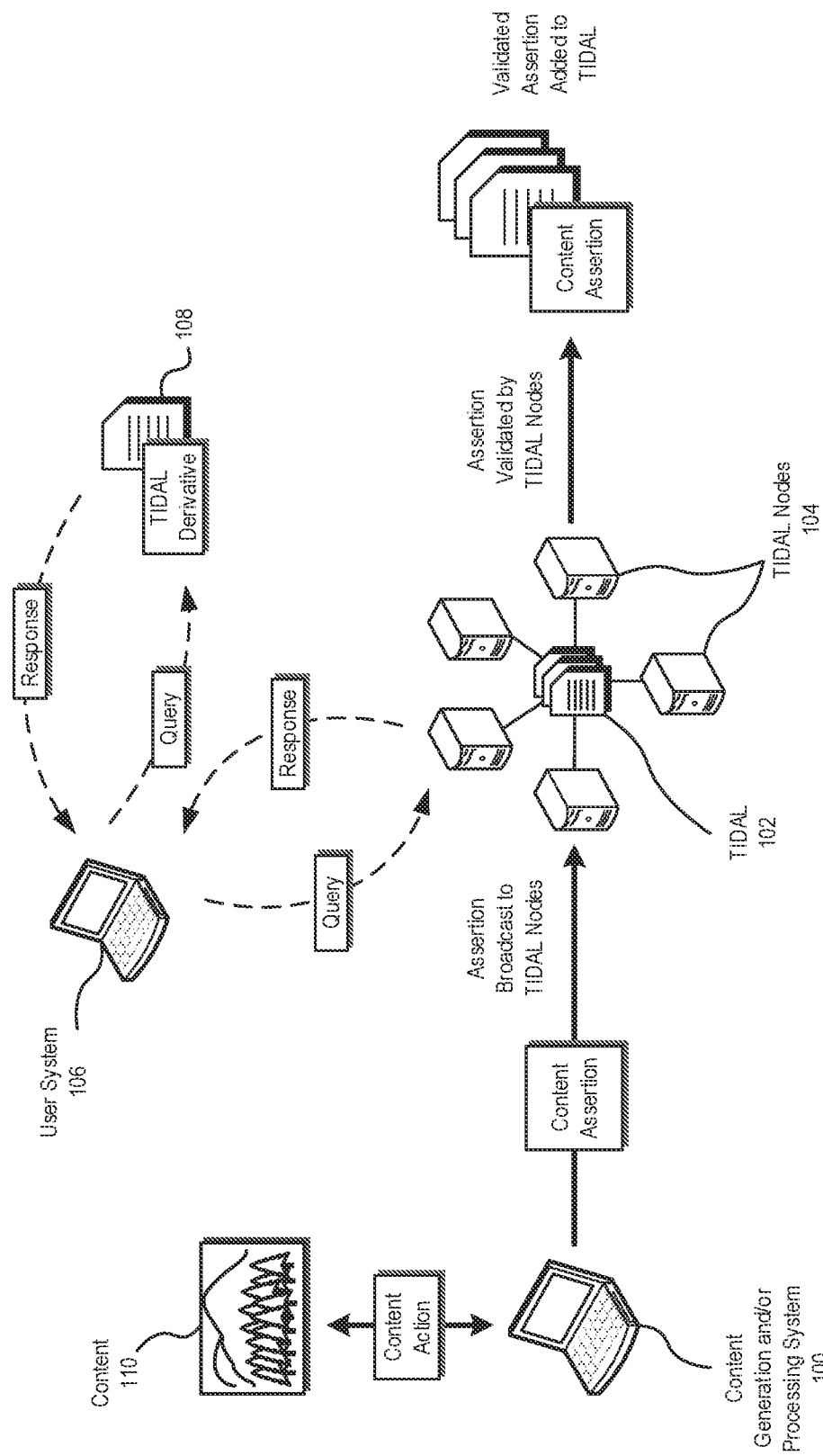
FIG. 1 illustrates an example of an architecture for managing and/or otherwise verifying the integrity of digital content using an immutable ledger consistent with certain embodiments disclosed herein.

A description of systems and methods consistent with embodiments of the present disclosure is provided herein. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to certain drawings. The components of the disclosed embodiments, as generally described and/or illustrated in the figures herein, could be arranged and designed in a wide variety of different configurations. Thus, the following description of the embodiments of the systems and methods of the disclosure is not intended to limit the scope of the disclosure, but is merely representative of possible embodiments of the disclosure. In addition, the steps of any method disclosed herein do not necessarily need to be executed in any specific order, or even sequentially, nor need the steps be executed only once, unless otherwise specified.

Embodiments of the disclosed systems and methods may allow for the establishment and/or verification of the credibility, authenticity, integrity, and/or provenance of digital content and/or media. Such content may include, without limitation, content relating to news and/or event reporting. In some embodiments, integrity may be established by creating digital signatures of digital content (e.g., news media recordings) and/or actions performed in connection with such content and making these signatures accessible to consuming users. In further embodiments, integrity may be established based on a notion of trusted entities. Digital signatures may be used to establish a history of editing, processing, and/or transformation actions performed in connection with digital content and/or particulars of various events associated with the content. Transparency may be provided by publishing the signatures of events in an immutable and/or otherwise indelible ledger and/or database such as, for example, a blockchain and/or other ledgers and/or databases such as a TIDAL.

Content credibility, authenticity, integrity, and/or provenance verification, consistent with certain embodiments disclosed herein, may involve producing and/or recording evidence that can be used to authenticate content by various content actors and, subsequently, verifying such evidence in connection with authentication processes when an entity wants to determine the credibility, authenticity, integrity, and/or provenance of the content. Various embodiments of the disclosed systems and methods may provide effective ways to both produce and/or record authentication evidence and to verify such evidence using content credibility, authenticity, integrity, and/or provenance verification processes.

Consistent with various embodiments disclosed herein, trusted ledger and/or database technology such as blockchain and/or other distributed ledger technologies that may securely and/or immutably record transactions and/or events on a world-wide scale may be used to build a digital media integrity verification platform. For example, in certain embodiments, a blockchain may be established that may comprise a distributed available (e.g., universally available) database and/or ledger of assertions about digital media and/or associated events. Entities may submit new entries that relate to the creation, modification and/or transformation, and/or distribution of digital media. Submitters may use an associated submitter public key to sign a binding of a subject public key to an assertion (e.g., in some circumstances, the subject could be the submitter's public key).

Trusted immutable databases and/or ledgers consistent with various aspects of the disclosed embodiments may be associated with a variety of properties that may include one or more of:

Ledger processes that may be resistant to byzantine failures.

Entries that may be immutable.

Entries that may be time synched (at least in part). Distinguished sets of new entries (e.g., such as blocks in a blockchain) may have an immutable ordering whereby newer (e.g., newer in actual time) entries may be relatively higher in order than earlier entries. Entries may be timestamped to identify a specific time of entry.

Ledgers may be scalable in number of entries.

Entries in a ledger may be available for relatively fast lookup and/or search.

In certain embodiments, scalability and fast lookup and/or search may be achieved and/or otherwise improved by using derivatives of an immutable ledger, if not by the ledger itself.

Consistent with various disclosed embodiments, ledger paradigms may comprise permissioned blockchains that use relatively efficient byzantine agreement protocols. In some embodiments, ledger entries may comprise assertions, made by a class of qualified submitters, that each binds a key (and/or a hash or other derivative of a key) with other attributes that are associated with that key, such as the identity of the owner, the scope of authority of the owner, information rights management permissions, and/or the like.

In various embodiments, a ledger may be distributed among a plurality of nodes. For example, in some embodiments, a TIDAL may be used in connection with the disclosed embodiments. In certain embodiments, TIDAL actors, nodes, and/or entities may include assertion submitters, witnesses and/or verifiers, and/or distributed ledger node operators. In other embodiments, a ledger used in connection with the disclosed systems and methods may not necessarily be distributed.

In certain embodiments, a ledger and/or database may comprise a blockchain, although other database and/or ledger structures may be used. For example, hashgraphs, tangles or directed, acyclic graphs, and/or the like may also be used in connection with various aspects of the disclosed embodiments. In some embodiments, ledgers may be publicly available, but in other embodiments they may not necessarily be publicly available. For example, in connection with various aspects of the disclosed embodiments, ledgers may not necessarily be publicly accessible in every application, with some applications using multiple ledgers, some of which may be public and some private.

A blockchain and/or other distributed ledger consistent with various disclosed embodiments may use a set of nodes. Full nodes may maintain a complete copy of the database and/or ledger. Partial nodes may have specialized capabilities and may store none and/or part of the database and/or ledger and/or an index thereof. Partial nodes may further maintain, for example, indexes, Bloom filters, shards, and/or other information generated based, at least in part, on associated databases and/or ledgers used in connection with various aspects of the disclosed embodiments.

A candidate pool of submissions may be maintained comprising submissions that are not yet committed to the blockchain database and/or ledger. Various aspects of the disclosed embodiments may provide a mechanism for achieving consensus. For example, a byzantine consensus protocol ("BCP") may be used whereby various full nodes agree on a block of submissions to be written to the blockchain database and/or ledger. For example, each node may verify the a priori verifiable claims made by a submitter and/or determine other compliance with policy. A node may be chosen (or otherwise emerge) according to protocol to propose a next block of submissions, and other nodes may register agreement. When the BCP concludes a block is written, other nodes may update the database and/or ledger. A block may, for example, include one or more of a previous block header hash, a merkle root of a hash tree of the submissions included in the block, and/or a time stamp for the block.

Certain implementations of the disclosed digital media integrity verification systems and methods may provide for a mechanism for reading and/or querying the ledger. For example, a ledger may be indexed by a hash, thumbprint, and/or other mechanism of the subject public key in submissions to expedite an answer to a ledger query (e.g., "Tell me everything you know about a piece of digital media", "Has the digital media been modified following its original recording?", "Is the individual who created the digital media a professional journalist?", etc.).

Certain embodiments of the disclosed digital media integrity verification platform may further provide for a subscription interface where one can subscribe to new assertions relating to a piece of digital media.

Content Integrity Verification Using Ledgers

FIG. 1 illustrates an example of an architecture for managing and/or otherwise verifying the integrity of digital content 110 using a ledger 102 consistent with certain embodiments disclosed herein. In certain embodiments, the ledger 102 may be distributed in nature and shared by a number of parties with varied interests that may have a common emergent goal of maintaining accurate reporting of events reflected in digital media. Although various embodiments disclosed herein are described in connection with a ledger 102 that comprises a TIDAL for illustration purposes, it will be appreciated that other types of ledgers and/or databases in other suitable forms may also be used in connection with the disclosed embodiments, including ledgers and/or databases that are not necessarily distributed and/or public.

As illustrated, a content generation and/or processing system 100 may submit an assertion related to a piece of digital content 110 for recordation in the ledger 102. In some embodiments, the content generation and/or processing system 100, operating as an assertion submitter, may be an entity and/or system that possesses credentials indicating authority to submit assertions for consideration to be recorded in the ledger 102.

In certain embodiments, the content generation and/or processing system 100 may operate as a content generation and/or producing client and comprise a device and/or an application executing thereon configured to record and/or otherwise generate digital media and/or generate a digitally signed record of the generation and/or creation of the digital media. In further embodiments, the content generation and/or processing system 100 may operate as an editing client. An editing client may transform, edit, and/or otherwise modify digital content such as, for example, a recording of an event. An editing client may also record what transformations and/or changes were performed to piece of digital content. Transformations and/or modifications to piece of digital content may include, for example, one or more of:

Cropping and/or removing portions. For example, a digital movie clip may be cropped to highlight a certain area of the clip.

Format changes. For example, a digital movie clip may be edited with respect to storage format to fit the flow of a stream that includes the movie clip. In another example, an audio recording can be rendered into a different format to save space and/or fit a rendering stream where the record is included.

Enhancements. For example, an audio recording may be enhanced to remove background noise.

Actions performed in connection with the piece of content 110 including, for example with without limitation, generation, creation, transformation, editing, processing, and/or modification, may be associated with a content assertion generated by the content generation and/or processing system 100 performing the action submitted for inclusion in the ledger 102.

The submitted content assertion may be broadcast to various ledger nodes 104 that may, among other things, maintain and/or manage the ledger 102. In certain instances herein, a ledger node 104 may be generally referred to as a content assertion management system. In certain embodiments, at least a portion of ledger nodes 104 may be configured to verify submitted assertions prior to recordation of the assertions in the ledger 102. Consistent with various disclosed embodiments, content assertions may be entered into the ledger 102 upon the agreement of multiple ledger nodes 104 operating as witnesses and/or verifiers. The ledger nodes 104 may verify the authenticity of the authority of the content generation and/or processing system 100 to verify that the content generation and/or processing system 100 is in fact authorized to make the assertion in accordance with one or more applicable policies. For example, the ledger nodes 104 may verify that an identifier submitted with the assertion (e.g., an ID of the content generation and/or processing system 100, a public key, and/or the like) is valid and/or has not been revoked.

In various embodiments, verified content assertions may be placed into a pool to be entered into the ledger 102, and when a threshold number of ledger nodes 104 operating as witness agree regarding the authenticity and/or the actual authority of the content generation and/or processing system 100 to make the content assertion, the content assertion may be recorded in the ledger 102. In certain embodiments, this agreement may be reached in accordance with an applicable agreement policy using, for example and without limitation, a byzantine agreement protocol and/or another suitable protocol. Once agreement has been reached, the content assertion may be considered validated by the ledger nodes 104 and the submission may be recorded and/or otherwise entered into the ledger 102. In certain embodiments, the ledger nodes 104 may be configured to generate cryptographic links between entries in the ledger 102 (e.g., between blocks in a blockchain).

A user system 106 interested in verifying the credibility, authenticity, integrity, and/or provenance of digital content 110 may query one or more of the ledger nodes 104 and/or other associated systems and receive associated responses that may providing information regarding the content 110 has that been recorded in the ledger 102. Returned information may be used by the user system 106 to ascertain the credibility, authenticity, integrity, and/or provenance of the digital content 110. For example, the user system 106 may operate as a content consuming system configured to verify digital media by inspecting available certificates and/or ledger entries recording certain chain-of-handling and/or provenance information relating to digital content 110.

In certain embodiments, a system may operate as both a user system 106 and a content generation and/or processing system 100. For example, an editing system may maintain a record of the pedigree of transformed content and record associated assertions in the ledger 102 that include a reference to prior content assertions associated with the content.

In various embodiments, the user system 106 may query a system maintaining a ledger derivative 108, which may comprise one of the ledger nodes 104 and/or another system, and may receive associated responses indicative of assertions recorded in the ledger derivative 108 and/or ledger 102. In some embodiments, a ledger derivative 108 may comprise one or more databases, tables, and/or ledgers derived from information included one or more ledgers and/or derivatives. A ledger derivative 108 may, in some instances, be focused on a class of applications that have specified requirements for efficiently authenticating specific content assertions. In certain applications, scalability and fast lookup and/or search may be achieved and/or otherwise improved by using a ledger derivative 108.

Content Assertions

Figure 2:
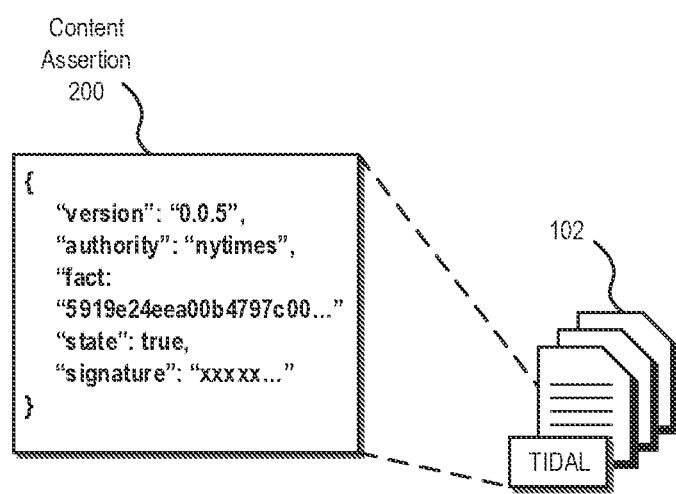
FIG. 2 illustrates an example of a content assertion included in an immutable ledger consistent with certain embodiments disclosed herein.

FIG. 2 illustrates an example of a content assertion 200 included in an immutable ledger 102 consistent with certain embodiments disclosed herein. In certain embodiments, content assertions 200 submitted and/or otherwise recorded in a ledger 102 may include an assertion that includes at least two sets of claims: (1) a set of a priori verifiable claims about the authority of the submitter to make the second set of record assertions and (2) one or more record assertions relating to the digital media. Record assertions included in a ledger 102 may comprise, for example, one or more of:

Geographical information. In some embodiments, noise may be added to geographic information.
Ownership information. For example, ownership information of a device may be provided in instances where a device is operated by a third party.
Identity information. Identity information may be provided regarding the operator of a device and/or an associated service.
Device capabilities and/or properties.
Commentary and/or other information associated with digital media at the time of the recording.

As illustrated, in certain embodiments, a content assertion 200 may include an indication of a version and/or iteration of an associated piece of content. A content assertion 200 may further include an indication of an identity and/or authority of a submitter of the content assertion (e.g., an identity and/or authority associated with a content generation and/or processing system).

The content assertion 200 may further include an asserted fact. In some embodiments, the asserted fact may comprise a hash (e.g., a SHA256 hash) of a statement associated with content. For example, in some embodiments, a fact included in a content assertion 200 may include a statement associating a hash of a photo and/or video file with a camera (e.g., a particular camera, a camera model type, and/or the like). In certain embodiments, a fact may comprise a hash of a JavaScript Object Notation ("JSON") structure that describes a relationship between a content actor (e.g., a content generation and/or processing system) with content. In further embodiments, the content assertion 200 may comprise a hash of a JSON structure that may be constructed by an assertion submitter and be used to verify a fact.

A content assertion 200 may further include a state which may signify whether an associated assertion is "true" or "false." The content assertion 200 may also include a signature associated with a submitter that may be used to verify the authority of the submitter. In certain embodiments, the signature may be associated with a particular user of a content generation and/or processing system, the content generation and/or processing system itself, an associated content capturing and/or generation device (e.g., a camera, a microphone, and/or the like), an application executing on the content generation and/or processing system, and/or the like.

Figure 3:
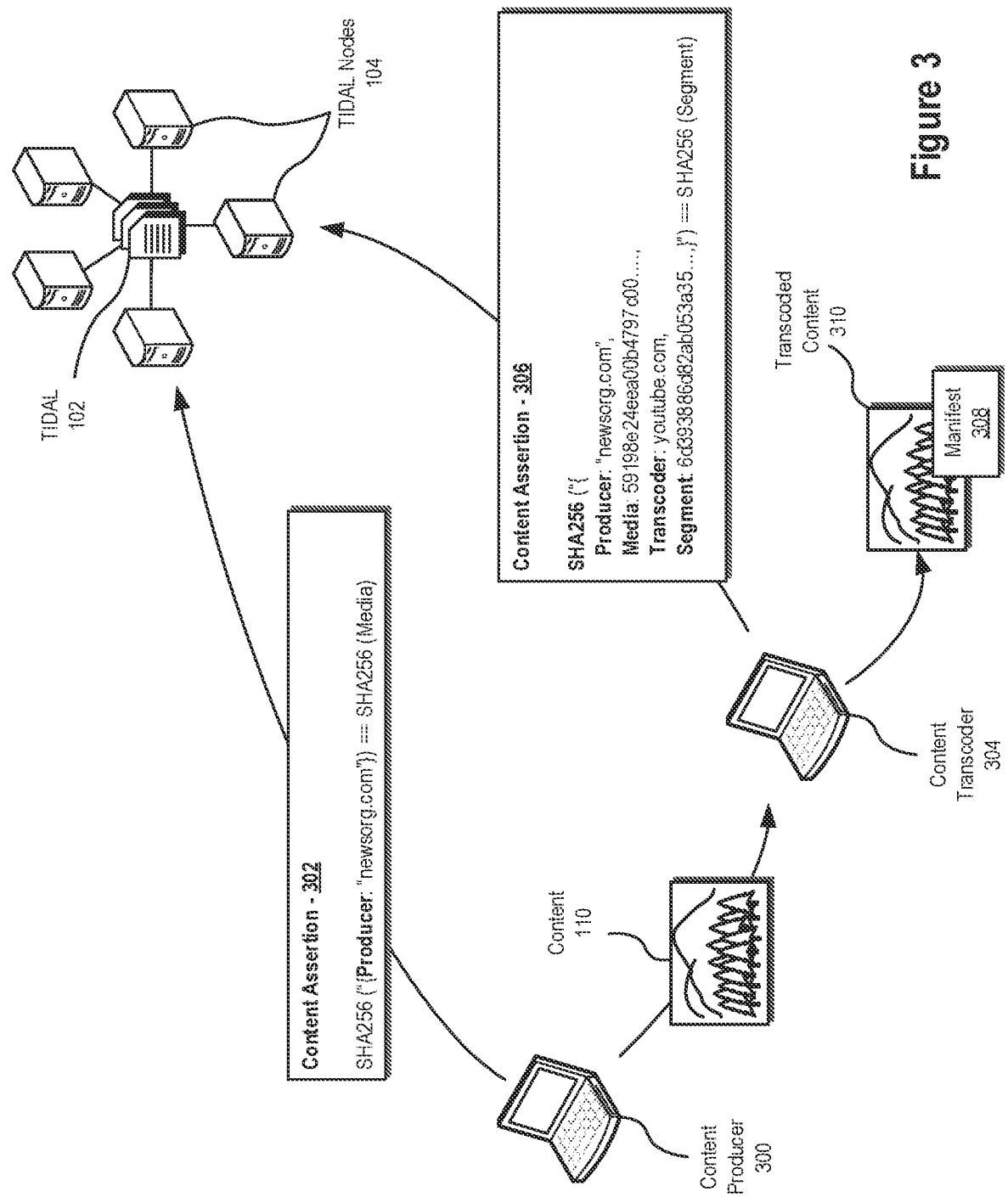
FIG. 3 illustrates an example of recording content assertions in an immutable ledger consistent with certain embodiments disclosed herein.

FIG. 3 illustrates an example of recording content assertions 302, 306 in an immutable ledger 102 consistent with certain embodiments disclosed herein. In certain embodiments, a plurality of content generation and/or processing systems may interact with the ledger 102 to record associated content assertions 302, 306. For example, as illustrated, a content producer system 300 associated with a trusted party that produces digital media (e.g., a news organization) may generate a content item 110.

After generating a content item 110, the content producer system 300 may submit to the ledger 102 a content assertion 302 that includes a fact that establishes a relationship between the producer and associated content 110 and/or media and/or a hash of the content 110 and/or media. The content producer system 300 may upload the content 110 to a content transcoding service 304 for further processing and/or transcoding. The content transcoding service 304 may transcode, distribute, and/or otherwise stream content uploaded by content producers (e.g., uploaded by the content producer system 300).

The content transcoding system 304 may further submit to the ledger 102 a content assertion 306 that includes a fact that establishes a relationship between the transcoding system 304, the producer system 300, the content item 110, and/or the transcoded content item 310. For example, the content assertion 306 may comprise a hash of an identity of the content producer, the content item 110 and/or hash of the content item 110, an identity of the content transcoding service 304, and/or an indication of a transcoded segment of the content item 110 and/or a hash of the transcoded content 310. This hash may be associated with a hash of the transcoded content 310 (e.g., the segment) and the associated hashes may be included in the content assertion 306.

Figure 4:
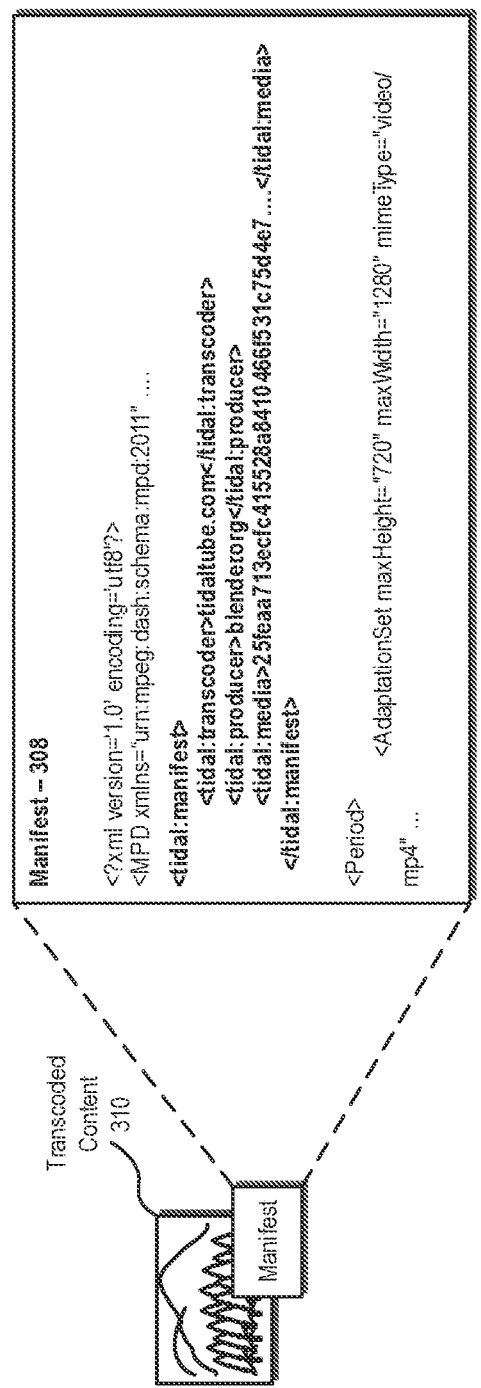
FIG. 4 illustrates an example of a content manifest consistent with certain embodiments disclosed herein.

The content transcoding system 304 may embed and/or otherwise securely associate a manifest 308 with the transcoded content 310. FIG. 4 illustrates an example of a content manifest 308 consistent with certain embodiments disclosed herein. In certain embodiments, the content manifest 308 may comprise information that may be used by a user system to reconstruct assertions recorded in a ledger by content generation and/or processing systems (e.g., a content producer system and/or a content transcoding service).

For example, the manifest 308 may comprise information providing an identity of a content transcoding service, and identity of a content producer, and a hash of the original content. A user system that wishes to verify the credibility, authenticity, integrity, and/or provenance of transcoded digital content 310 may generate a hash of the information included in the manifest 308 (e.g., the identity of the content transcoding service, and identity of a content producer, and a hash of the original content) and a hash of the transcoded content 310. This hash may be queried against the information included in a trusted ledger to determine whether a corresponding assertion has previously been recorded in the ledger that matches the assertion generated by the user system. If the hash is present in the trusted ledger, the user system may verify the integrity of the transcoded content 310. If the hash value is not present, however, the user system may determine that the transcoded content 310 has been modified from what was transcoded by an associated transcoding service and that the integrity of the transcoded content 310 is suspect.

Content Integrity Verification Process

Figure 5:
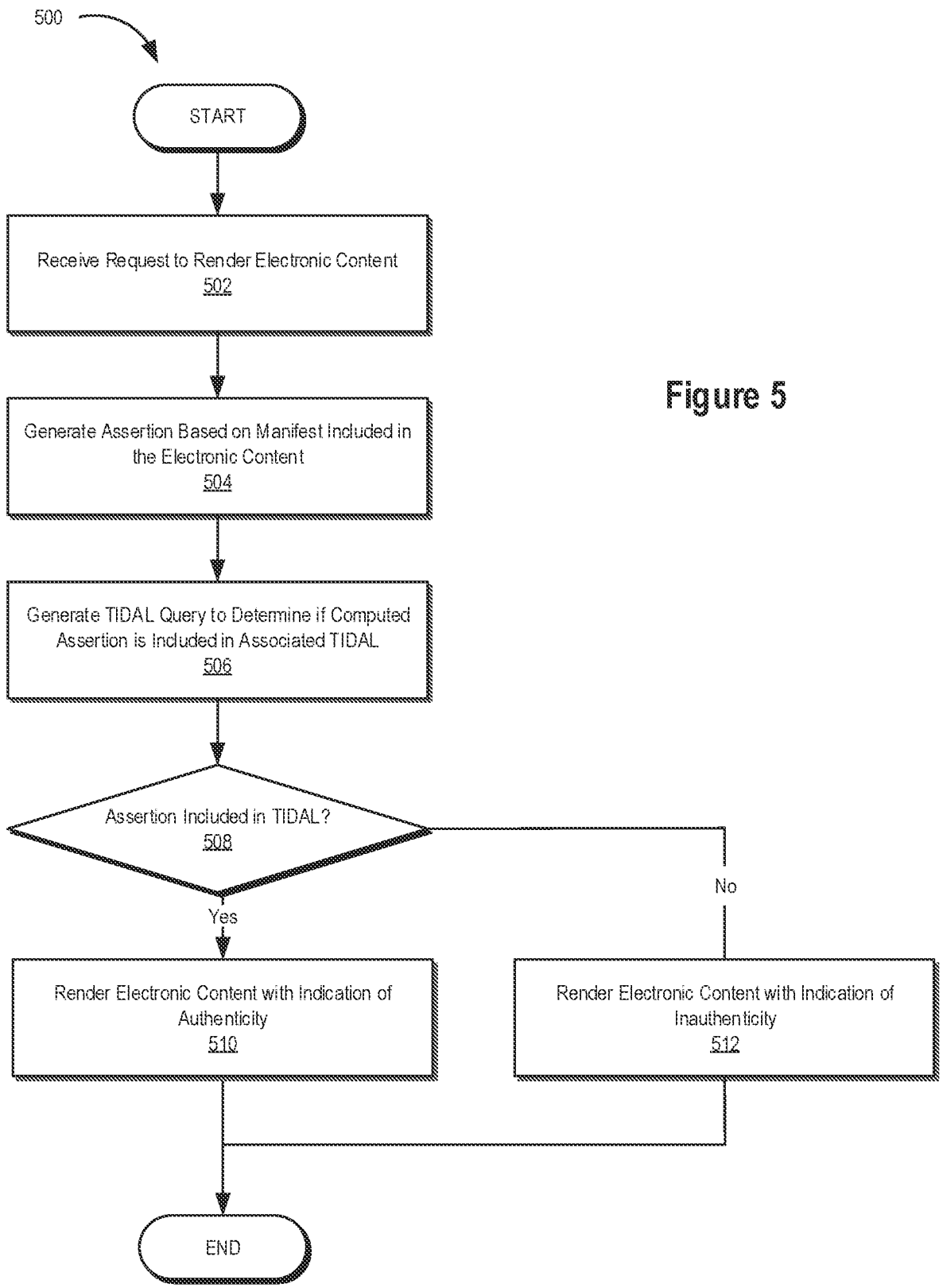
FIG. 5 illustrates a flow chart of an example of a method for verifying the integrity of digital content consistent with certain embodiments disclosed herein.

FIG. 5 illustrates a flow chart of an example of a method 500 for verifying the integrity of digital content consistent with certain embodiments disclosed herein. The illustrated method 500 may be implemented in a variety of ways, including using software, firmware, hardware, and/or any combination thereof. In certain embodiments, various aspects of the method 500 and/or its constituent steps may be performed by a user device, a node maintaining a trusted ledger, and/or any other suitable system and/or services or combination of systems and/or services.

At 502, a request to render content may be received by a user system. For example, a user system may receive a user request to render streamed content from a content streaming service.

An assertion may be generated based on the content (e.g., the transcoded content) at 504. For example, in some embodiments, the content may comprise manifest information that may be used to generate an assertion associated with the content that may be used to verify the integrity of the content. The generated assertion may be provided to one or more systems maintaining a trusted ledger recording trusted assertions associated with the content item as part of a generated query at 506. For example, a TIDAL node may be queried to determine whether the assertion generated at 504 and/or a hash thereof is included in a TIDAL maintained by the node.

At 508, it may be determined whether the generated assertion included in the query is included in the trusted ledger. If the query assertion is included in the trusted ledger, the content may be rendered at 510 with an indication of the authenticity and/or integrity of the content. If the query assertion is not included in the trusted ledger, the electronic content may be rendered at 512 with an indication of questionable authenticity and/or integrity.

Figure 6A:
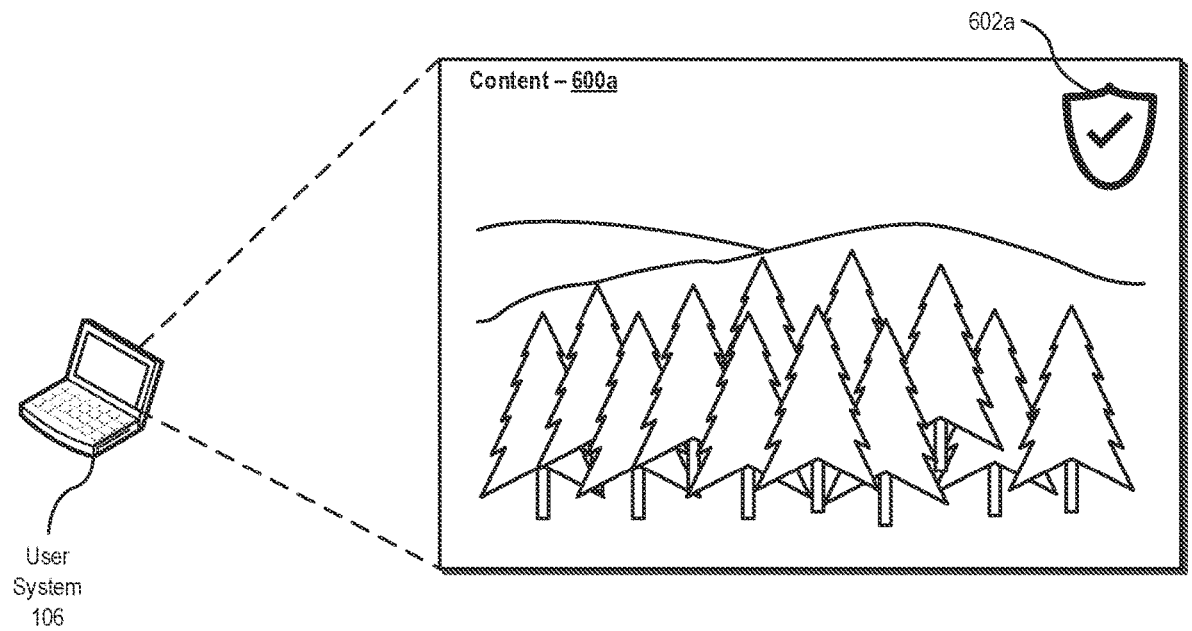
FIG. 6a illustrates an example of displaying content with a first indication of integrity consistent with certain embodiments disclosed herein.
Figure 6B:
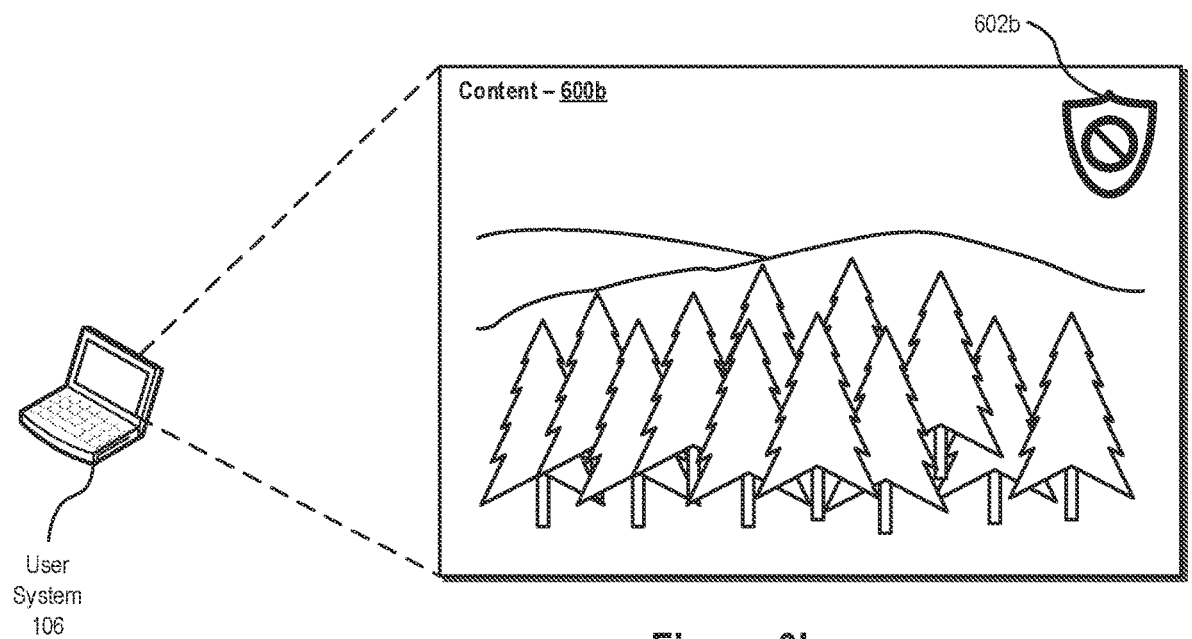
FIG. 6b illustrates an example of displaying content with a second indication of integrity consistent with certain embodiments disclosed herein.

FIG. 6a and FIG. 6b illustrate examples of displaying content 600a, 600b with indications of integrity 602a, 602b consistent with certain embodiments disclosed herein. As illustrated, content 600a, 600b may be rendered with an indication of integrity 602a, 602b corresponding to an associated result of a query to a trusted ledger. For example, if it is determined that a queried assertion generated based on content 600a and/or associated manifest information is included in an associated trusted ledger, content 600a may be rendered with a first indication of integrity 602a indicating that the content 600a is authentic and/or has not been modified, transformed, and/or otherwise processed from what was generated by an associated content generation and/or processing system that recorded the assertion previously in the trusted ledger. Similarly, if it is determined that a queried assertion generated based on content 600b and/or associated manifest information is not included in an associated trusted ledger, content 600b may be rendered with a second indication of integrity 602b indicating that the content 600b is not authentic and/or has been modified, transformed, and/or otherwise processed from what was originally generated by an associated content generation and/or processing system that recorded the assertion previously in the trusted ledger.

Trusted Content Assertions

Certain systems and devices used in connection with the disclosed embodiments may include tamper resistant hardware and/or software and/or may support methods for associating the systems and devices with identity (e.g., via a DRM personalization process and/or the like). For example, in certain embodiments, various content generation and/or processing systems and/or services may comprise tamper resistant hardware and/or software that may be used in connection with generating and/or transforming content and/or generating assertions associated with the same. Consistent with certain embodiments, assertions generated by such trusted systems and/or services recorded in a ledger may include an indication relating to a trusted environment associated with the system and/or service that recorded the assertion.

Figure 7:
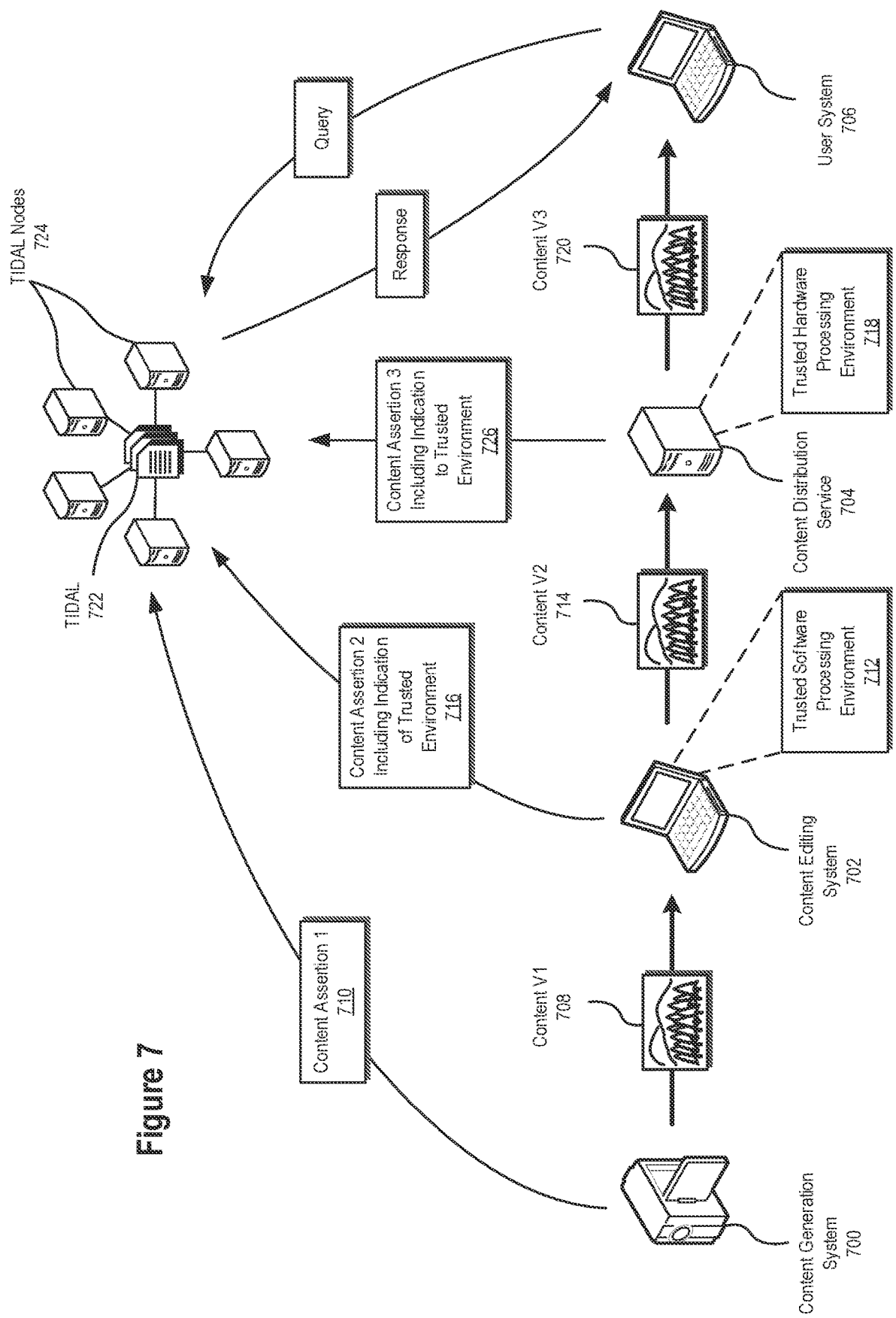
FIG. 7 illustrates an example of recording trusted content assertions in an immutable ledger consistent with embodiments disclosed herein.

FIG. 7 illustrates an example of recording trusted content assertions in an immutable ledger 722 consistent with embodiments disclosed herein. As illustrated, a content generation system 700 (e.g., a camera system and/or the like) may generate a digital content and/or media item: Content "Version 1" 708. After generating content item 708, the content generation system 700 may upload to one or more nodes 724 maintaining the trusted ledger 722 a content assertion 710 associated with the generation of content item 708 for recordation in the trusted ledger 722.

A content editing system 702 may transform and/or edit content item 708 to generate a transformed content item: Content "Version 2" 714. In some embodiments, the content editing system 702 may include a trusted software processing environment 712 that may be used in connection with generating of content item 714 and/or associated content assertions. In connection with generating the edited content item 714, the content editing system 702 may generate a content assertion 716 and communicate the content assertion 716 to one or more ledger nodes 724 for recordation in the ledger 722. Consistent with aspects of the disclosed embodiments, the content assertion 716 may include an indication relating to the trusted software processing environment 712 of the content editing system 702.

A content distribution system 704 may process content item 714 to generate a content item for distribution: Content "Version 3" 720. In some embodiments, the content distribution service 704 may include a trusted hardware processing environment 718 that may be used in connection with generating content item 720 and/or associated content assertions. In connection with generating content item 720 for distribution, the content distribution service 704 may generate a content assertion 726 and communicate the content assertion 726 to one or more ledger nodes 724 for recordation in the ledger 722. Consistent with aspects of the disclosed embodiments, the content assertion 726 may include an indication relating to the trusted hardware processing environment 718 of the content distribution system 704.

A user system 706 interested in verifying the credibility, authenticity, integrity, and/or provenance of the distributed content item 720 may query one or more of the ledger nodes 724 and/or other associated systems and receive associated responses that may provide information regarding the content 720 has that been recorded in the ledger 722. Such responses may include information regarding assertions made by the content generation system 700, the content editing system 702, and the content distribution system 704 and/or any associated trusted software and/or hardware processing environments 712, 718. Returned information may be used by the user system 706 to ascertain the credibility, authenticity, integrity, and/or provenance of the digital content 720.

In certain embodiments, including assertions that comprise an indication relating to a trusted environment associated with a system and/or service that recorded the assertion may provide a measure of trust used in connection with verifying the authenticity, integrity, and/or provenance of the digital content. In this manner, content assertions (e.g., assertions 716, 722) including indications associated with trusted environments (e.g., trusted hardware and/or software environments) used to generate the assertions and/or interact with associated content items may provide anchors of trust within a chain of assertions associated with the provenance of a content item. Such anchors may be useful in connection with forensic activities and/or examination of the provenance of a content item as well as in other contents.

Example—Authenticity Verification Using Content Assertion Ledgers

An organization interested in the integrity of digital news media may be formed. The group may recommend that media used in reputable news feeds include a digital trace of the recording. This digital trace may include a hash of the media (e.g., footage of a news event), an identity token of an individual/entity responsible for the media recording, and/or other parameters such as, for example, a location of the recording.

In one example, to further a nefarious agenda, a group may release a video clip where a speech by a head of state that includes the phrase "We will never surrender" is edited to read "We will surrender." From an initial viewing, the footage may appear legitimate. An individual viewing the footage via a browser may use an associated button (e.g., a legitimacy check button) and/or other suitable interface to verify the legitimacy of the footage by initiating a query to an associated trusted ledger.

In another example, a group may attempt to spread false news by creating computer-generated footage of the head of a large corporation bemoaning the loss of a large lawsuit to depress the corporation's stock price and facilitate a less than true market value stock purchase. The footage may not be signed by a recording device, which may be indicative of a dubious origin. There may also be no valid signature of ownership, which may indicate that the originator of the footage does not wish to appear in the open. Since the footage is be signed by an editing device rather than a recording device, it may be determined that it is likely fabricated. By checking relevant signature information against a trusted ledger, it may be determined that the footage is of nefarious origin (e.g., by virtue of it not being signed by a recording device or having an ownership signature).

In a further example, a group may wish to create public chaos and/or mayhem by posting images and/or videos of an oil refinery on fire that is allegedly located in Texas with commentary from an alleged reporter. Using a consumption device, suspicious viewers may check the pedigree of the footage by querying a trusted ledger, and may discover that the footage was recorded years prior in Eastern Europe. The viewer may thus dismiss the reporting as false.

Example—Transparency and Content Assertion Ledgers

A trusted ledger may be established by a variety of originations sharing a common interest. Nodes maintaining the trusted ledger may include police agencies who want to demonstrate the integrity of the police bodycam footage to the public and the judiciary and/or facilitate transparency in policing. Other nodes maintaining the trusted ledger may be associated with civil liberties advocacy organizations who also want to ensure the integrity of police bodycams and/or video clips taken close to a police bodycam. Further nodes may be operated by an organization associated with independent security camera providers.

The participating organizations may share a common interest to ensure that members act with integrity so as to not taint the organizations as a whole. They may also have a variety of competing interests. For example, local police agencies may have an interest in showing only portions of recordings, while suppressing other portions. Similarly, the civil liberty advocacy organizations may have an interest in showing different portions of recordings, while suppressing other portions. Finally, the independent security camera providers may have an interest in providing its customers with recordings relevant to their service.

In one example, a law enforcement officer may be approached by an individual. The officer and the individual may engage in a conversation about current events. An organization with a political agenda, however, may take published clips from the officer's bodycam and additional clips and arrange a video that shows an alleged unprovoked attack on the individual's civil liberties by the officer. The various footage may be signed by legitimate recording devices, but the arrangement of the clips in time may result in the footage being deceptive. Since the bodycams and other recording devices associated with the event have associated events recorded in a trusted ledger, it may be determined that the entire sequence from the bodycam footage in the edited footage was not included and/or that the sequence of events are depicted in a different order from what actually occurred. The public may then use such information to request that the entire unedited footage be released, and any nefarious efforts of the organization proffering the doctored footage may be frustrated.

In another example, a first individual may visit the tropics on holiday. While there, the individual may capture footage of a rare shark. The first individual may show the footage to a second individual, who may share it with a wildlife documentary production studio that may compensate the second individual for the footage. The first individual may refer to entries associated with the footage in a trusted ledger that predate any entries associated with the second individual, and therefore may be deemed the original creator of the footage.

Example—Public/Private Originators and Content Assertion Ledgers

In some circumstances, the originator of digital media may want to publish their name with the media to claim ownership of the content. In other circumstances, such as a whistleblower scenario, the originator may decide to maintain anonymity for the sake of reducing personal liability, while still maintaining the option of claiming ownership of the content in the future.

In one example, an individual may discover malfeasance within their organization. They may wish to report the perpetrators, may be also be afraid of retaliation. The individual may also be interested in certain remuneration from the government provided to validated whistleblower claims.

The individual may publish a digital stream that documents the malfeasance, inserting a record of the creation of the digital stream into an associated trusted ledger. To avoid retaliation, the individual may publish the digital stream anonymously. After any active controversy surrounding the whistleblower claim has subsided, the individual may wish to provide a proof of identity that binds him to the digital record of the creation of the digital stream.

In certain embodiments, ownership of a record may have multiple stake holders, and individual stakeholders may decide whether they wish to remain anonymous and/or be identifiable publicly.

Time Stamps

Time stamps associated with events recorded within a trusted ledger consistent with various aspects of the disclosed embodiments may be generated using a central trusted source of time and/or based on a group decision. In a system with many isolated actors and no central time source, time and/or temporal order may be established via votes and/or rules. For example, time associated with a record may be established as the median of all the sampled clocks in a time request.

Temporal order may be further defined as an order in which records are inserted into a trusted ledger, and wall time may be estimated as a function of a network time resolution, the estimated time before and/or after an event. For example, if events are entered into the trusted ledger on the average of once per second, the time before an event is estimated to be 10:29±30 seconds, and the time after the event is estimated to be 10:31±20 seconds, it can reasonably be said that the event under observation happened at 10:30±one minute. A more refined estimate may depend on the precise architecture of the system and a dynamic analysis of the parameters.

Figure 8:
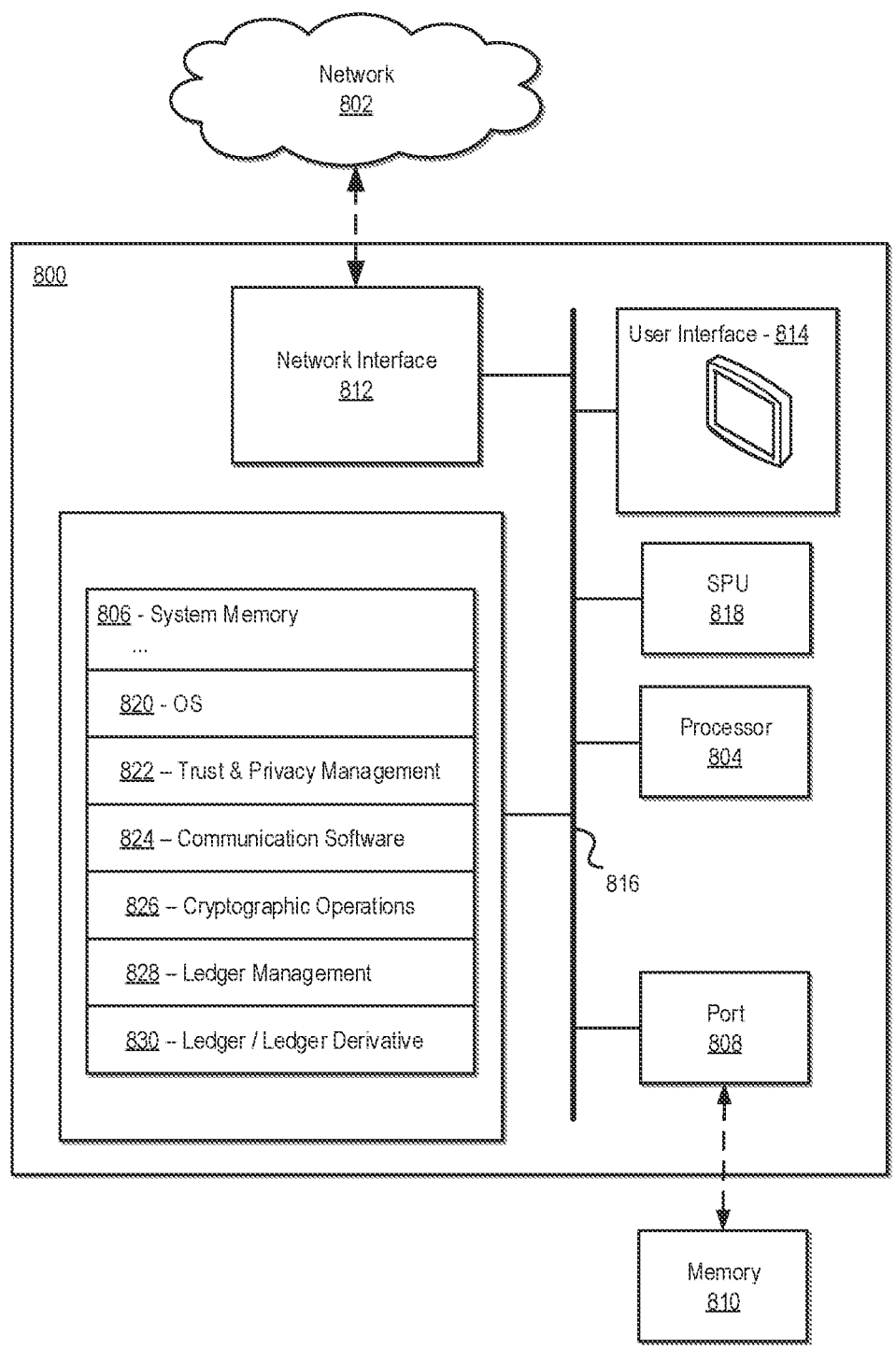
FIG. 8 illustrates an example of a system that may be used to implement certain embodiments of the systems and methods of the present disclosure

FIG. 8 illustrates an example of a system 800 that may be used to implement certain embodiments of the systems and methods of the present disclosure. The system 800 of FIG. 8 may comprise a system and/or device associated with an assertion submitter, a witness, distributed ledger node operator, a content generation and/or processing system, a user system, and/or a querying system consistent with embodiments disclosed herein, and/or any other system, service, device, entity, node, application, and/or component configured to implement embodiments of the disclosed systems and methods.

The various systems and/or devices used in connection with aspects the disclosed embodiments may be communicatively coupled using a variety of networks and/or network connections (e.g., network 802). In certain embodiments, the network 802 may comprise a variety of network communication devices and/or channels and may utilize any suitable communications protocols and/or standards facilitating communication between the systems and/or devices. The network 802 may comprise the Internet, a local area network, a virtual private network, and/or any other communication network utilizing one or more electronic communication technologies and/or standards (e.g., Ethernet or the like). In some embodiments, the network 802 may comprise a wireless carrier system such as a personal communications system ("PCS"), and/or any other suitable communication system incorporating any suitable communication standards and/or protocols. In further embodiments, the network 802 may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network 802 may incorporate one or more satellite communication links. In yet further embodiments, the network 802 may utilize IEEE's 802.11 standards, Bluetooth®, ultra-wide band ("UWB"), Zigbee®, and or any other suitable standard or standards.

The various systems and/or devices used in connection with aspects of the disclosed embodiments may comprise a variety of computing devices and/or systems, including any computing system or systems suitable to implement the systems and methods disclosed herein. For example, the connected devices and/or systems may comprise a variety of computing devices and systems, including laptop computer systems, desktop computer systems, server computer systems, distributed computer systems, smartphones, tablet computers, and/or the like.

In certain embodiments, the systems and/or devices may comprise at least one processor system configured to execute instructions stored on an associated non-transitory computer-readable storage medium. As discussed in more detail below, systems used in connection with implementing various aspects of the disclosed embodiments may further comprise a secure processing unit ("SPU") configured to perform sensitive operations such as trusted credential and/or key management, cryptographic operations, secure policy management, and/or other aspects of the systems and methods disclosed herein. The systems and/or devices may further comprise software and/or hardware configured to enable electronic communication of information between the devices and/or systems via a network using any suitable communication technology and/or standard.

As illustrated in FIG. 8, the example system 800 may comprise: a processing unit 804; system memory 806, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 804; a port 808 for interfacing with removable memory 810 that may include one or more diskettes, optical storage mediums (e.g., flash memory, thumb drives, USB dongles, compact discs, DVDs, etc.) and/or other non-transitory computer-readable storage mediums; a network interface 812 for communicating with other systems via one or more network connections and/or networks 802 using one or more communication technologies; a user interface 814 that may include a display and/or one or more input/output devices such as, for example, a touchscreen, a keyboard, a mouse, a track pad, and the like; and one or more busses 816 for communicatively coupling the elements of the system.

In some embodiments, the system 800 may, alternatively or in addition, include an SPU 818 that is protected from tampering by a user of the system or other entities by utilizing secure physical and/or virtual security techniques. An SPU 818 can help enhance the security of sensitive operations such as personal information management, trusted credential and/or key management, privacy and policy management, and other aspects of the systems and methods disclosed herein. In certain embodiments, the SPU 818 may operate in a logically secure processing domain and be configured to protect and operate on secret information, as described herein. In some embodiments, the SPU 818 may include internal memory storing executable instructions or programs configured to enable the SPU 818 to perform secure operations, as described herein.

The operation of the system 800 may be generally controlled by the processing unit 804 and/or an SPU 818 operating by executing software instructions and programs stored in the system memory 806 (and/or other computer-readable media, such as removable memory 810). The system memory 806 may store a variety of executable programs or modules for controlling the operation of the system. For example, the system memory may include an operating system ("OS") 820 that may manage and coordinate, at least in part, system hardware resources and provide for common services for execution of various applications and a trust and privacy management system 822 for implementing trust and privacy management functionality including protection and/or management of personal data through management and/or enforcement of associated policies. The system memory 810 may further include, without limitation, communication software 824 configured to enable in part communication with and by the system, one or more applications, a cryptographic operation module 826 configured to perform various aspects of the disclosed embodiments (e.g., message generation, cryptographic key and hashing operations, etc.), a ledger management module 828 configured to perform various ledger management operations consistent with the disclosed embodiments, one or more distributed ledgers and/or ledger derivatives 830, and/or any other information and/or applications configured to implement embodiments of the systems and methods disclosed herein.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein but may be modified with the scope and equivalents of the appended claims.

What is claimed is:

1. A method performed by a user system comprising a processor and a non-transitory computer-readable storage medium storing instructions that, when executed by the processor, cause the user system to perform the method, the method comprising:
   receiving a request to validate a first piece of digital content;
   generating a first trusted ledger query, the first trusted ledger query comprising a hash of the first piece of digital content;
   querying a trusted assertion management system managing a first trusted ledger with the first trusted ledger query to determine whether the first trusted ledger comprises at least one entry that comprises the hash of the first piece of digital content;
   receiving a first response from the trusted assertion management system, the first response indicating that the first trusted ledger comprises a first entry, the first entry comprising the hash of the first piece of digital content and information associated with at least a first trusted processing environment used to process the first piece of digital content; and
   rendering the first piece of digital content to a user of the user system in connection with an indication, the indication being based, at least in part, on the received first response from the trusted assertion management system.

2. The method of claim 1, wherein the indication comprises an indication of an integrity of the first piece of digital content.

3. The method of claim 1, wherein the indication comprises an indication of a provenance of the first piece of digital content.

4. The method of claim 1, wherein the indication comprises an indication of an authenticity of the first piece of digital content.

5. The method of claim 1, wherein the indication comprises an indication that the first piece of digital content was generated using a second piece of digital content.

6. The method of claim 1, wherein the first trusted ledger comprises cryptographically-linked ledger entries.

7. The method of claim 1, wherein the first trusted ledger comprises a blockchain ledger.

8. The method of claim 1, wherein the first trusted ledger comprises ledger entries derived, at least in part, from at least a second trusted ledger.

9. The method of claim 1, wherein the at least a first trusted processing environment comprises a trusted hardware environment.

10. The method of claim 1, wherein the at least a first trusted processing environment comprises a trusted software environment.

11. The method of claim 5, wherein the method further comprises
receiving a second response from the trusted assertion management system, the second response comprising an indication that the first trusted ledger comprises a second entry, the second entry comprising a hash of the second piece of digital content, a hash of a third piece of digital content, and an indication of at least a second trusted processing environment used to process the third piece of digital content to generate the second piece of digital content.

12. The method of claim 11, wherein the indication is further based, at least in part, on the received second response from the trusted assertion management system.

13. The method of claim 1, wherein the method further comprises receiving the first piece of content by the user system and a content manifest associated with the first piece of content.

14. The method of claim 13, wherein the content manifest is securely associated with the first piece of content.

15. The method of claim 14, wherein the content manifest is embedded within the first piece of digital content.

16. The method of claim 14, wherein the content manifest further comprises a hash of a second piece of digital content.

17. The method of claim 16, wherein the method further comprises:
generating a second trusted ledger query, the second trusted ledger query comprising the hash of the second piece of digital content;
querying the trusted assertion management system with the second trusted ledger query to determine whether the first trusted ledger comprises at least one entry that comprises the hash of the second piece of digital content.

18. The method of claim 17, wherein the method further comprises:
receiving a second response from the trusted assertion management system, the second response indicating that the first trusted ledger comprises a second entry, the second entry comprising the hash of the second piece of digital content.

19. The method of claim 18, wherein the indication is further based, at least in part, on the received second response from the trusted assertion management system.

20. The method of claim 13, wherein the content manifest further comprises at least one of information associated with an identity of a producer of the first piece of digital content, information associated with a processor of the first piece of digital content, and information associated with an identity associated with the first trusted processing environment.

21. The method of claim 1, wherein the first entry further comprises information associated with an identity of a producer of the first piece of digital content.

22. The method of claim 1, wherein the information associated with the at least a first trusted processing environment comprises information associated with an identity associated with the first trusted processing environment.

* * * * *